(12) United States Patent
Brown et al.

(10) Patent No.: US 9,165,293 B2
(45) Date of Patent: Oct. 20, 2015

(54) SYSTEMS AND METHODS FOR WAVEFORM TRANSMISSION OF TRANSACTION CARD DATA

(75) Inventors: David C. Brown, Dardenne Prairie, MO (US); Simon Blythe, Ely (GB); Deborah M. Kimberg, Chesterfield, MO (US); Mostafa Hussein Sabet, Greenwich, CT (US)

(73) Assignee: MasterCard International Incorporated, Purchase, NY (US)

( * ) Notice: Subject to any disclaimer, the term of this patent is extended or adjusted under 35 U.S.C. 154(b) by 874 days.

(21) Appl. No.: 13/436,033

(22) Filed: Mar. 30, 2012

(65) Prior Publication Data
US 2013/0256397 A1 Oct. 3, 2013

(51) Int. Cl.
*G06K 7/00* (2006.01)
*G06Q 20/20* (2012.01)
*G06Q 20/32* (2012.01)

(52) U.S. Cl.
CPC .............. *G06Q 20/20* (2013.01); *G06Q 20/322* (2013.01)

(58) Field of Classification Search
USPC ......... 235/375, 379, 380, 435, 439, 449, 487, 235/493; 705/5, 35–45
See application file for complete search history.

(56) References Cited

U.S. PATENT DOCUMENTS

| | | |
|---|---|---|
| 5,886,333 A | 3/1999 | Miyake |
| 6,029,892 A | 2/2000 | Miyake |
| 6,705,520 B1 | 3/2004 | Pitroda et al. |
| 6,769,607 B1 | 8/2004 | Pitroda et al. |
| 7,028,897 B2 | 4/2006 | Fernandes et al. |
| 7,051,932 B2 | 5/2006 | Fernandes et al. |
| 7,114,652 B2 | 10/2006 | Moullette et al. |
| 7,252,232 B2 | 8/2007 | Fernandes et al. |
| 7,357,319 B1 | 4/2008 | Liu et al. |
| 7,552,094 B2 | 6/2009 | Park et al. |
| 7,581,678 B2 | 9/2009 | Narendra et al. |
| 7,810,729 B2 | 10/2010 | Morley, Jr. |
| 7,828,214 B2 | 11/2010 | Narendra et al. |
| 7,920,851 B2 | 4/2011 | Moshir et al. |
| 7,954,715 B2 | 6/2011 | Narendra et al. |
| 7,954,716 B2 | 6/2011 | Narendra et al. |
| 7,954,717 B2 | 6/2011 | Narendra et al. |
| 8,011,577 B2 | 9/2011 | Mullen et al. |
| 8,083,145 B2 | 12/2011 | Narendra et al. |
| 8,091,786 B2 | 1/2012 | Narendra et al. |
| 8,302,860 B2 | 11/2012 | McKelvey |
| 8,313,037 B1 | 11/2012 | Humphrey |
| 2010/0108762 A1* | 5/2010 | Morley, Jr. .................... 235/449 |
| 2010/0213265 A1 | 8/2010 | Narendra et al. |

* cited by examiner

*Primary Examiner* — Matthew Mikels
(74) *Attorney, Agent, or Firm* — Armstrong Teasdale LLP

(57) ABSTRACT

A device and method for waveform transmission of transaction card data to a merchant point-of-sale device are provided. The device includes a memory device for storing data, a processor, and a transmitter. The device is programmed to receive transaction card data that mimics data stored within a magnetic stripe associated with a transaction card, convert the transaction card data to a first data file for storage within the memory device, transmit the first data file to the transmitter, and transmit a first waveform from the transmitter to the POS device, wherein the first waveform includes changes in a magnetic field that represent the transaction card data.

22 Claims, 7 Drawing Sheets

SYSTEMS AND METHODS FOR WAVEFORM TRANSMISSION OF TRANSACTION CARD DATA

BACKGROUND OF THE INVENTION

The field of the invention relates generally to a portable computer device configured to transmit transaction card data in a waveform to a merchant point-of-sale (POS) device and, more particularly, to a method and system for converting magnetic stripe data coupled to a payment card into transaction card data that mimics the magnetic stripe data, and transmitting the transaction card data as a wave signal from the computer system to a merchant POS device.

Payment cards, such as credit and debit cards, are used for transacting business and making purchases throughout our society. Traditional payment card environments involve a merchant-controlled point of interaction (POI). Traditional points of interaction include POS devices, access through a merchant website, and interaction through a merchant telephone to initiate the authorization request. Collectively, these traditional points of interaction might be referred to as a merchant environment. For all interactions within this environment, an account number associated with a cardholder's financial transaction card is entered into the specific merchant's environment in order to conduct the transaction and/or obtain an authorization.

In the case of the POS devices, the cardholder typically gives the payment card to a merchant to swipe or key into the merchant POS device, or the cardholder himself swipes his card into the merchant's POS device for further processing. Payments for approved transactions are managed with the issuer or merchant's acquirer based on the specific card payment network or closed loop environment.

These payment cards typically have a magnetic stripe for storing cardholder account data. The stripe includes three tracks: track 1, track 2 and track 3. Magnetic stripe cards store data by modifying the magnetism of tiny iron-based magnetic particles on a band of magnetic material on the card. The magnetic stripe is read by physical contact and swiping past a magnetic reading head housed within the merchant's POS device.

A number of International Organization for Standardization standards, ISO/IEC 7810, ISO/IEC 7811, ISO/IEC 7812, ISO/IEC 7813, ISO 8583, and ISO/IEC 4909, now define the physical properties of these payment cards, including size, flexibility, location of the magnetic stripe, magnetic characteristics, and data formats. They also provide the standards for the allocation of card number ranges to different card issuing institutions. Standards also define the magnetic domain encoding for tracks 1 and 2, respectively, of magnetic stripe cards. Track 3 of magnetic stripe cards is used by some organizations such as ATM machines for read and write functions, and utilizes unique organization encoding schemes.

Despite advancements in this technology, there remain 21 million world-wide merchants having only magnetic stripe card acceptance systems. Many of these merchants obtained their magnetic stripe card acceptance system years ago, and are resistant towards replacing their equipment and undergoing training in the use of newer systems. As a result, most new financial card equipment sales are merely replacement models. Upgrades to new equipment, including merchant systems capable of reading the RF proximity chip cards, is primarily driven by head offices of franchise or branch retail stores desiring to improve inventory, financial accounting, and similar functions, who may not necessarily exert influence over individual, independent merchants. Yet another barrier to adopting technology for RF proximity chip card transactions is that manufacturers of magnetic stripe card acceptance systems may disqualify any attempt to upgrade their devices through direct modification of electrical connections, thereby discouraging upgrades by third party equipment suppliers.

A problem thus exists whereby the technology for more secure consumer/user financial data storage and transactions is available, but is compromised by a reluctance of merchants to replace their existing POS card acceptance systems. Therefore, it can be seen that there is a need in the art for devices and methods which enable older legacy POS card acceptance systems to be non-invasively adapted to interact with various newer technology devices, such as smart phones, to meet the desires of the transaction industry, and the desires of the merchants.

Accordingly, systems and methods are needed that enable a cardholder to make a purchase from a merchant by converting magnetic stripe card data from a payment card into a waveform, storing the waveform within a portable computing device such as a smart phone, and transmitting a wave signal based on the waveform from the computing device to a point-of-sale (POS) device.

BRIEF DESCRIPTION OF THE INVENTION

In one embodiment, a computing device for waveform transmission of transaction card data to a merchant point-of-sale device is provided. The device includes a memory device for storing data, a processor, and a transmitter. The device is programmed to receive transaction card data that mimics data stored within a magnetic stripe associated with a transaction card, convert the transaction card data to a first data file for storage within the memory device, convert the transaction card data to a first data file for storage within the memory device, transmit the first data file to the transmitter, and transmit a first waveform from the transmitter to the POS device, wherein the first waveform includes changes in a magnetic field that represent the transaction card data.

In another embodiment, a computer-based method for transmitting transaction card data to a merchant POS device by a portable computer device is provided. The portable computer device includes a memory device, a processor, and a transmitter. The method includes receiving transaction card data that mimics magnetic stripe data associated with a transaction card, converting the transaction card data to a first data file for storage within the memory device, the conversion being performed by the processor, communicating the first data file to the transmitter, and using the transmitter to transmit a first waveform to the POS device, wherein the first waveform comprises changes in a magnetic field that represent the transaction card data.

In yet another embodiment, one or more non-transitory computer-readable storage media having computer-executable instructions embodied thereon for causing the transmission of transaction card data from a portable computing device to a merchant POS device is provided. The portable computing device includes a memory device, a processor, and a transmitter. When executed by a processor, the instructions cause the processor to receive transaction card data that mimics data stored within a magnetic stripe associated with a transaction card, convert the transaction card data to a first data file for storage within the memory device, transmit the first data file to the transmitter, and transmit a first waveform from the transmitter to the POS device, wherein the first waveform includes changes in a magnetic field that represent the transaction card data.

BRIEF DESCRIPTION OF THE DRAWINGS

FIG. 1 is a schematic diagram illustrating an exemplary multi-party payment card industry system for enabling ordinary payment-by-card transactions in which merchants and card issuers do not necessarily have a one-to-one relationship.

FIG. 2 is a simplified block diagram of an exemplary payment processing system including a cardholder computing system in accordance with one example embodiment of the present invention.

FIG. 3 is an expanded block diagram of an exemplary embodiment of a server architecture of the payment processing system including the plurality of computer devices in accordance with one example embodiment of the present invention.

FIG. 4 illustrates an exemplary configuration of a client system shown in FIGS. 2 and 3.

FIG. 5 illustrates an exemplary configuration of a server system shown in FIGS. 2 and 3.

FIG. 6 illustrates a known financial transaction card for use in the cardholder computing system shown in FIGS. 2 and 3.

FIG. 7 illustrates an exemplary configuration of the cardholder computing system and the merchant POS device shown in FIGS. 2 and 3 in accordance with an exemplary embodiment of the present invention.

FIG. 8 is a data flow diagram showing the transmission of data between the cardholder computing system, the POS device, and the payment processing system as shown in FIGS. 2 and 3 in accordance with an exemplary embodiment of the present invention.

DETAILED DESCRIPTION OF THE INVENTION

Figure 1:
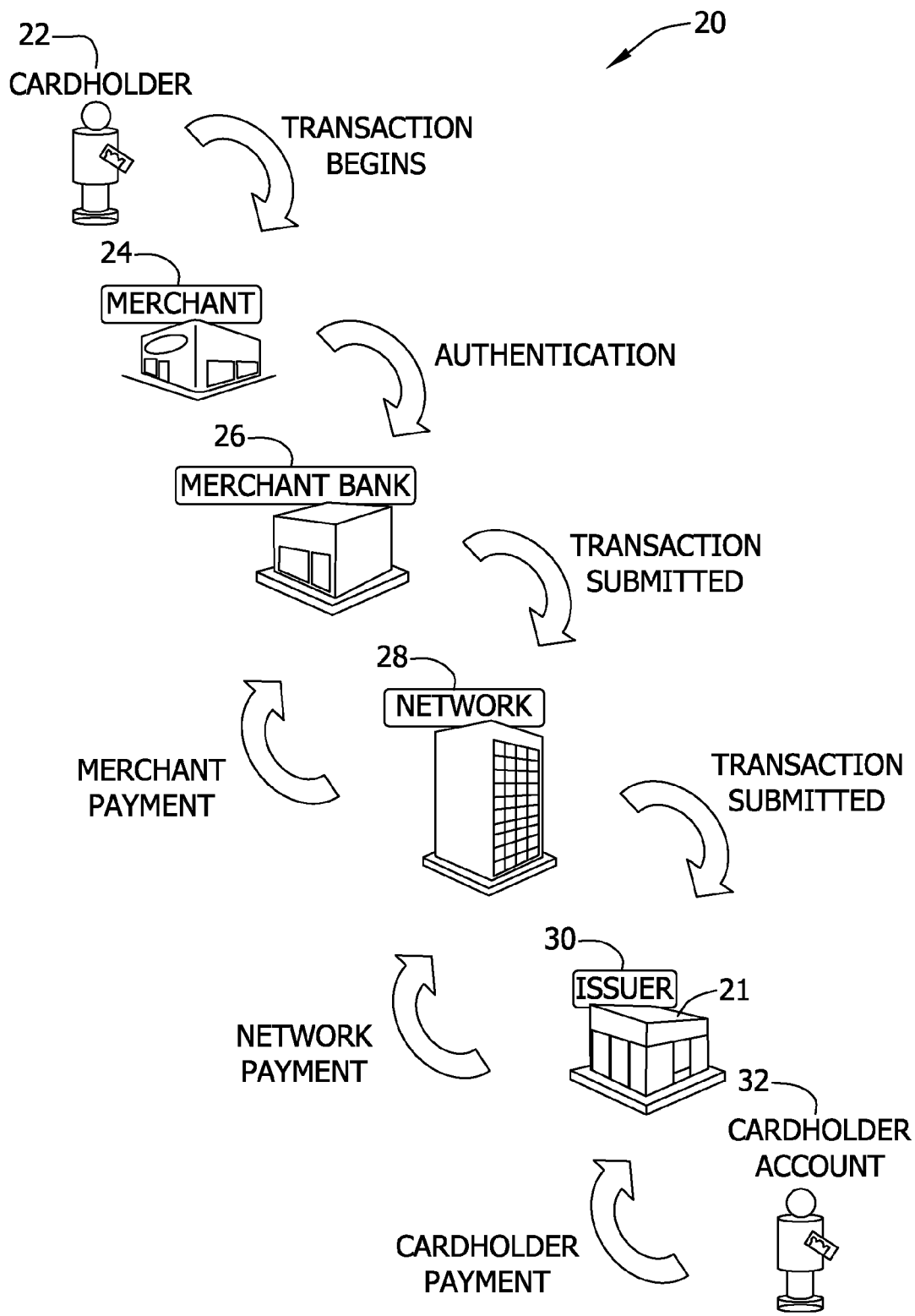
FIGS. 1-8 show exemplary embodiments of the device and method described herein.

Embodiments of the present invention relate generally to contactless transmission of transaction card data from a cardholder computing device to a point-of-sale (POS) device at a merchant. The transaction card data is converted data that mimics the data stored within a magnetic stripe that is attached to a transaction card (also referred to as "magstripe data" or "magnetic stripe data"). The methods and systems described herein include a cardholder computing system that includes a cardholder computing device and a transmitter. The cardholder computing device includes a processor and a memory device. The POS device includes a magnetic reader head, a processor, and a transceiver for transmitting and receiving an authorization message to an issuer bank associated with issuing the transaction card to the cardholder.

The memory device in communication with the cardholder computing device is used to store data including transaction card data. The transaction card data is converted data that mimics the magstripe data stored within the magnetic stripe coupled to a face of the transaction card. Thus, the magstripe data stored within the magstripe (e.g., tracks 1, 2 and 3) on a transaction card is converted into a first data file by the computing device processor and is stored within the memory device of the cardholder computing device. In the example embodiment, the first data file is a binary data file of transaction card data. The cardholder computing device includes computer-readable instructions stored within the memory device that, upon execution by the processor, converts the magstripe data into a binary data file of transaction card data. The computing device is configured to further process the first data file, and generate a first waveform (e.g., an audio waveform) using at least one of amplitude and frequency changes to represent polarity shifts included within the magstripe data.

The transmitter is coupled to the cardholder computing device through an audio jack or a proprietary interface such as a USB connector or a smartphone dock connector. In the example embodiment, the transmitter contains an electromagnet that is configured to receive the first waveform generated by the computing device, and output a second waveform in the form of a magnetic field that is receivable by the magnetic reader head included within the POS device. The magnetic reader head included within the POS device is able to receive the second waveform from the cardholder computing device, wherein the second waveform represents the transaction card data. The POS device processor processes the received second waveform and converts it into a second data file that represents the transaction card data. The POS device is further configured to process the received transaction card data, and generate an authorization request message that is transmitted to the issuer bank via an interchange network.

Thus, the cardholder computing system is configured to transmit transaction card data, which is converted from the magstripe data stored on a transaction card and mimics the magstripe data, to a POS device without the transaction card being placed in contact with the POS device. Rather, the transmitter coupled to the cardholder computing device is configured to, wirelessly and without contacting the POS device, transmit a second waveform representing the transaction card data to the magnetic reader head of the POS device. The POS device processor converts the second waveform into a second data file representing the transaction card data, and then into an authorization request message that is transmitted by the transceiver to the issuer bank.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, smartphones, personal digital assistants (PDAs), key fobs, and/or computers. Each type of transactions card can be used as a method of payment for performing a transaction. In addition, consumer card account behavior can include but is not limited to purchases, management activities (e.g. balance checking), bill payments, achievement of targets (meeting account balance goals, paying bills on time), and/or product registrations (e.g. mobile application downloads).

In one embodiment, a computer program is provided, and the program is embodied on a computer readable medium. In an exemplary embodiment, the system is executed on a single computer system, without requiring a connection to a sever computer. In a further exemplary embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The system is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the invention by way of example and not by way of limitation. It is contemplated that the invention has general application to processing financial transaction data by a third party in a variety of applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present invention are not intended to be interpreted as excluding the existence of additional embodiments that also incorporate the recited features.

FIG. 1 is a schematic diagram illustrating an exemplary multi-party transaction card industry system 20 for enabling ordinary payment-by-card transactions in which merchants 24 and card issuers 30 do not need to have a one-to-one special relationship. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card, merchant 24 requests authorization from a merchant bank 26 for the amount of the purchase. The request may be performed over the telephone, but is usually performed through the use of a point-of-sale device, which reads cardholder's 22 account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale device will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale device. This may include bundling of approved transactions daily for standard retail purchases. If cardholder 22 cancels a transaction before it is captured, a "void" is generated. If cardholder 22 returns goods after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

Figure 2:
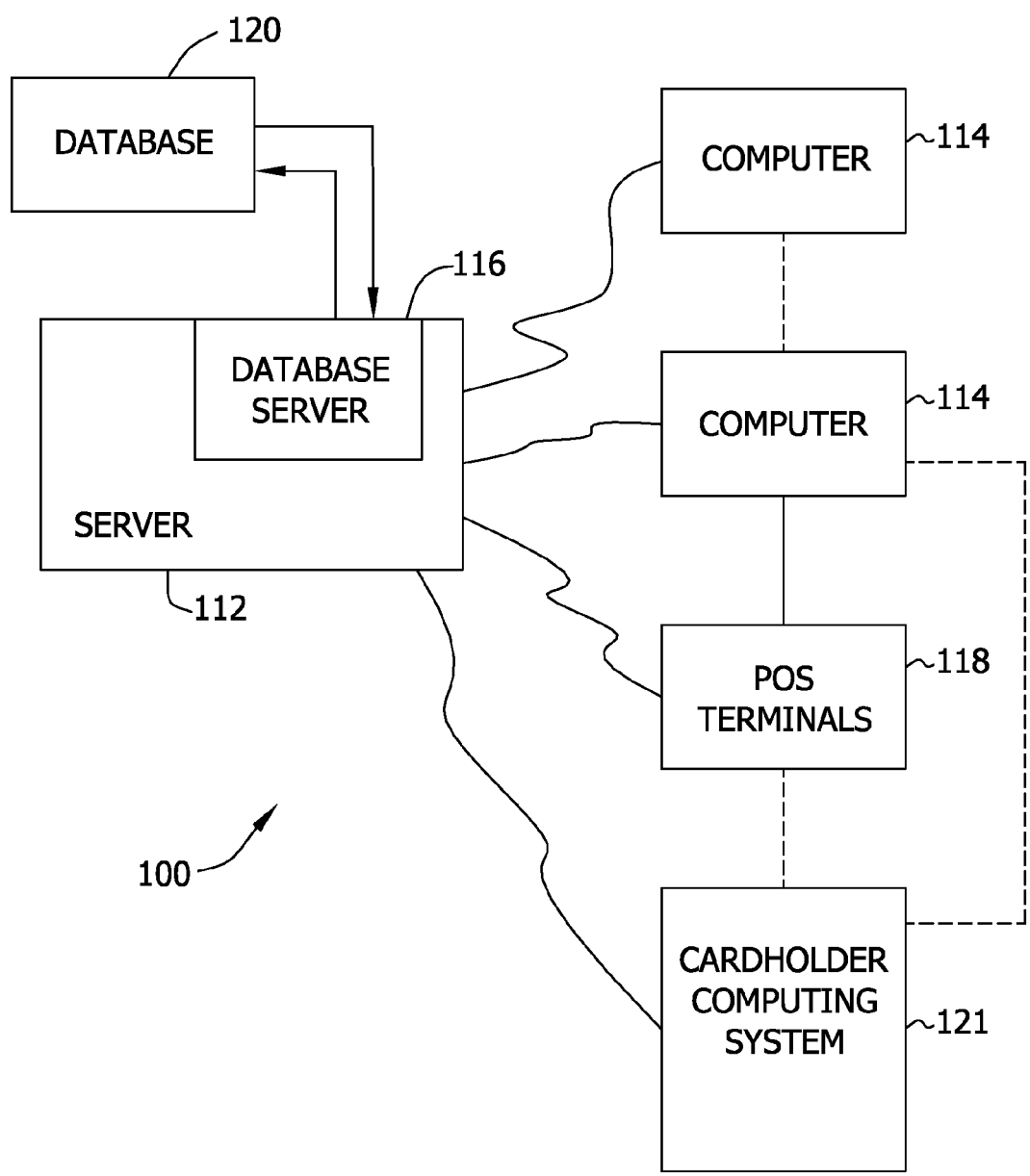

FIG. 2 is a simplified block diagram of an exemplary payment processing system 100 including a plurality of computer devices in accordance with one embodiment of the present invention. In the example embodiment, system 100 may be used for performing payment-by-card transactions received as part of processing the financial transaction.

More specifically, in the example embodiment, system 100 includes a server system 112, and a plurality of client subsystems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems, and special high-speed Integrated Services Digital Network (ISDN) lines. Client systems 114 could be any device capable of interconnecting to the Internet including a web-based phone, PDA, or other web-based connectable equipment.

System 100 also includes point-of-sale (POS) device 118, which may be connected to client systems 114 and may be connected to server system 112. POS device 118 is interconnected to the Internet through many interfaces including a network, such as a local area network (LAN) or a wide area network (WAN), dial-in-connections, cable modems, wireless modems, and special high-speed ISDN lines. POS device 118 can be any device capable of interconnecting to the Internet and including an input device capable of reading information from a consumer's financial transaction card.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities conducted over the processing network including data relating to merchants, account holders or customers, issuers, acquirers, and/or purchases made. Database 120 may also store account data including at least one of a cardholder name, a cardholder address, an account number, and other account identifier. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data.

In the exemplary embodiment, one of client systems 114 may be associated with acquirer bank 26 (shown in FIG. 1) while another one of client systems 114 may be associated with issuer bank 30 (shown in FIG. 1). POS device 118 may be associated with a participating merchant 24 (shown in FIG. 1) or may be a computer system and/or mobile system used by a cardholder making an on-line purchase or payment. Server system 112 may be associated with interchange network 28. In the exemplary embodiment, server system 112 is associated with a network interchange, such as interchange network 28, and may be referred to as an interchange computer system. Server system 112 may be used for processing transaction data. In addition, client systems 114 and/or POS device 118 may include a computer system associated with at least one of an online bank, a bill payment outsourcer, an acquirer bank, an acquirer processor, an issuer bank associated with a transaction card, an issuer processor, a remote payment system, and/or a biller.

System 100 also includes a cardholder computing system 121 in communication with POS device 118. In the exemplary embodiment, cardholder computing system 121 includes a processor, a memory device, and a transmitter for transmitting transaction card data to POS device 118. For example, cardholder computing system 121 may include mobile phones, smartphones, personal digital assistants (PDAs), iPhone® (iPhone is a registered trademark of Apple, Incorporated located in Cupertino, Calif.), Android® (Android is a registered trademark of Google Incorporated, located in Mountain View, Calif.), and/or any device capable of executing stored computer-readable instructions. Cardholder computing system 121 is also wirelessly connected to server 112 or client systems 114. Accordingly, each party involved in processing transaction data are associated with a computer system shown in system 100 such that the parties can communicate with one another as described herein.

Using the interchange network, the computers of the merchant bank or the merchant processor will communicate with the computers of the issuer bank to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account is decreased. Normally, a charge is not posted immediately to a consumer's account because bankcard associations, such as MasterCard International Incorporated®, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale device. If a consumer cancels a transaction before it is captured, a "void" is generated. If a consumer returns goods after the transaction has been captured, a "credit" is generated.

For debit card transactions, when a request for a PIN authorization is approved by the issuer, the consumer's account is decreased. Normally, a charge is posted immediately to a consumer's account. The bankcard association then transmits the approval to the acquiring processor for distribution of goods/services, or information or cash in the case of an ATM.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which is settled as a group.

The financial transaction cards or payment cards discussed herein may include credit cards, debit cards, a charge card, a membership card, a promotional card, prepaid cards, and gift cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), key fobs, or other devices, etc.

Figure 3:
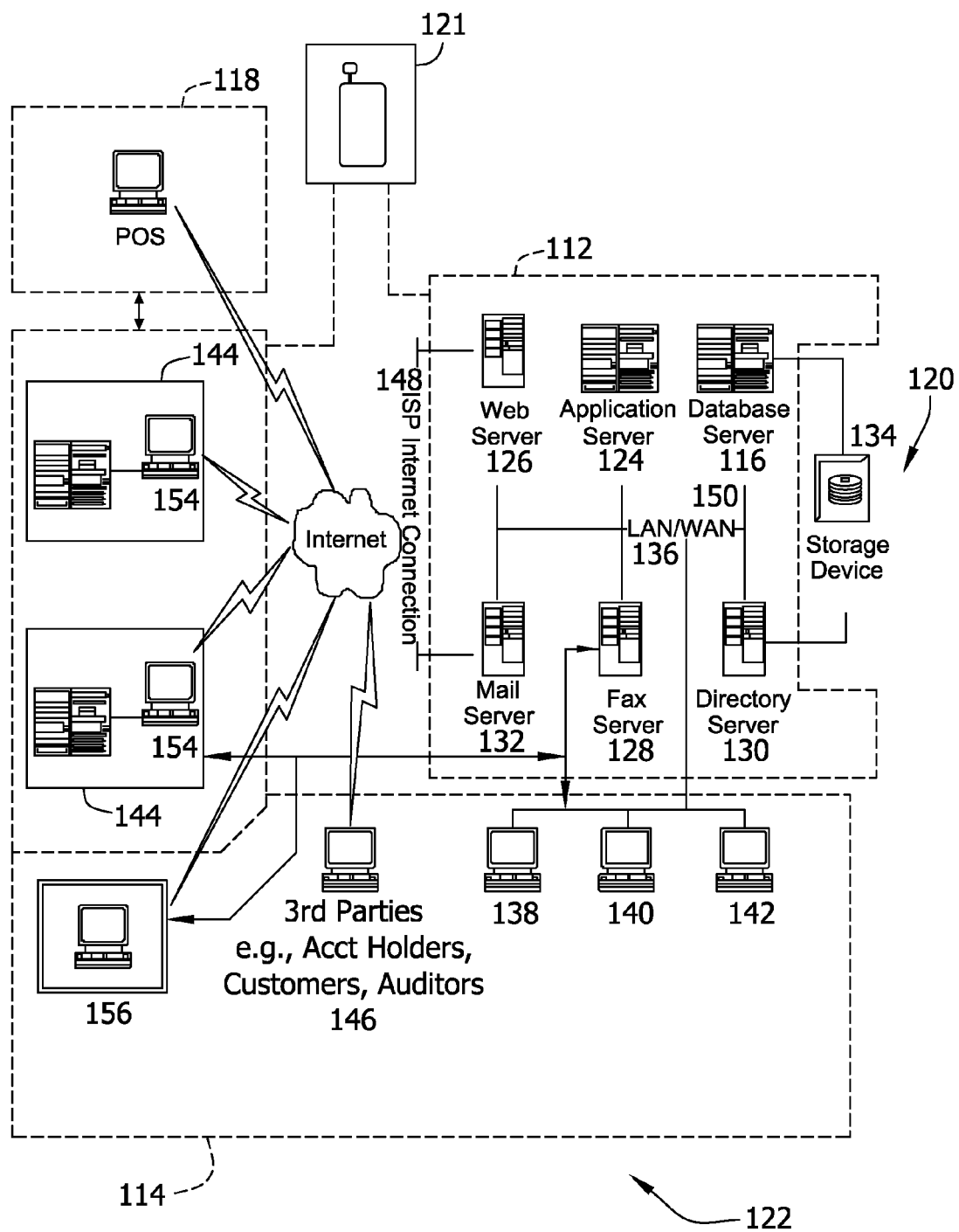

FIG. 3 is an expanded block diagram of an exemplary embodiment of a server architecture of a payment processing system 122 including other computer devices in accordance with one embodiment of the present invention. Components in system 122, identical to components of system 100 (shown in FIG. 2), are identified in FIG. 3 using the same reference numerals as used in FIG. 2. System 122 includes server system 112, client systems 114, and POS device 118, and cardholder computing system 121. Server system 112 further includes database server 116, an application server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, developers, consumers, merchants, acquirers, issuers, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

In the example embodiment, cardholder computing system 121 is in wireless communication with POS device 118 or, alternatively, may be in wireless communication with server system 112 or client systems 114 and other workstations through a network connection.

Figure 4:
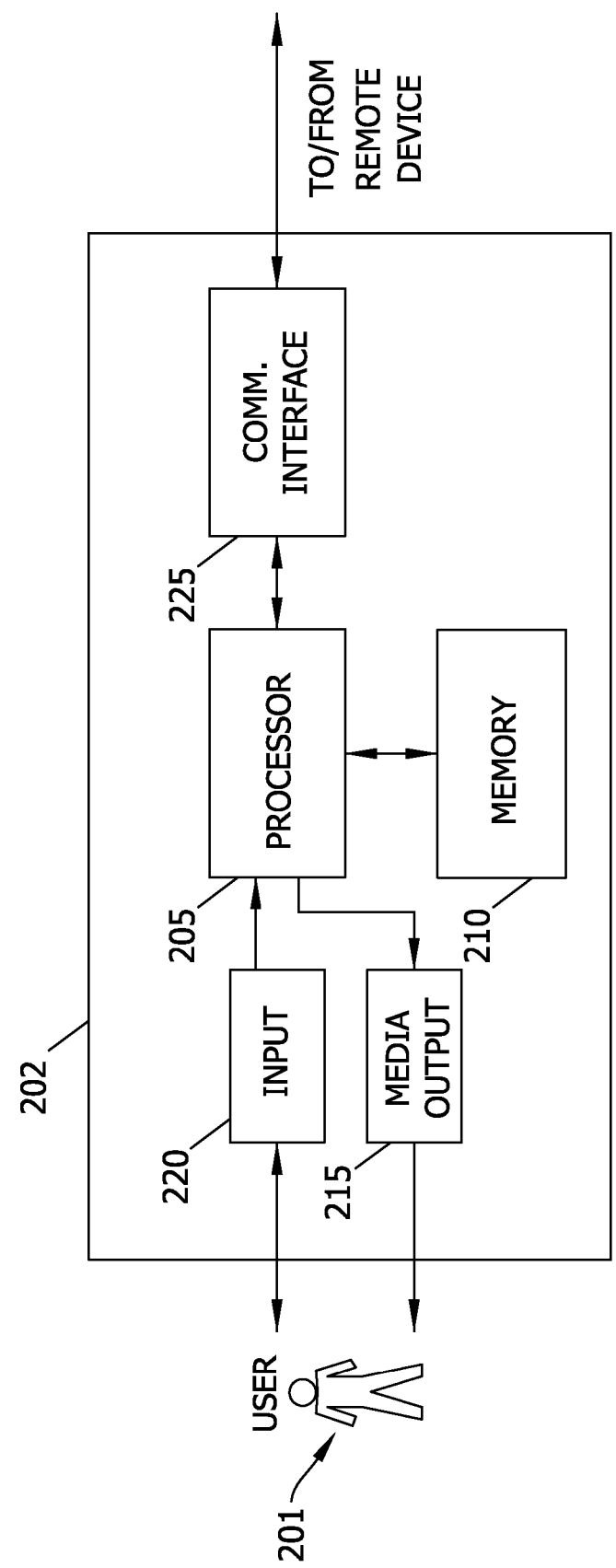

FIG. 4 illustrates an exemplary configuration of a user system 202 operated by a user 201, such as cardholder 22 (shown in FIG. 1). User system 202 may include, but is not limited to, cardholder computing system 121, client systems 114, 138, 140, and 142, POS device 118, workstation 154, and manager workstation 156. In the exemplary embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as server system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
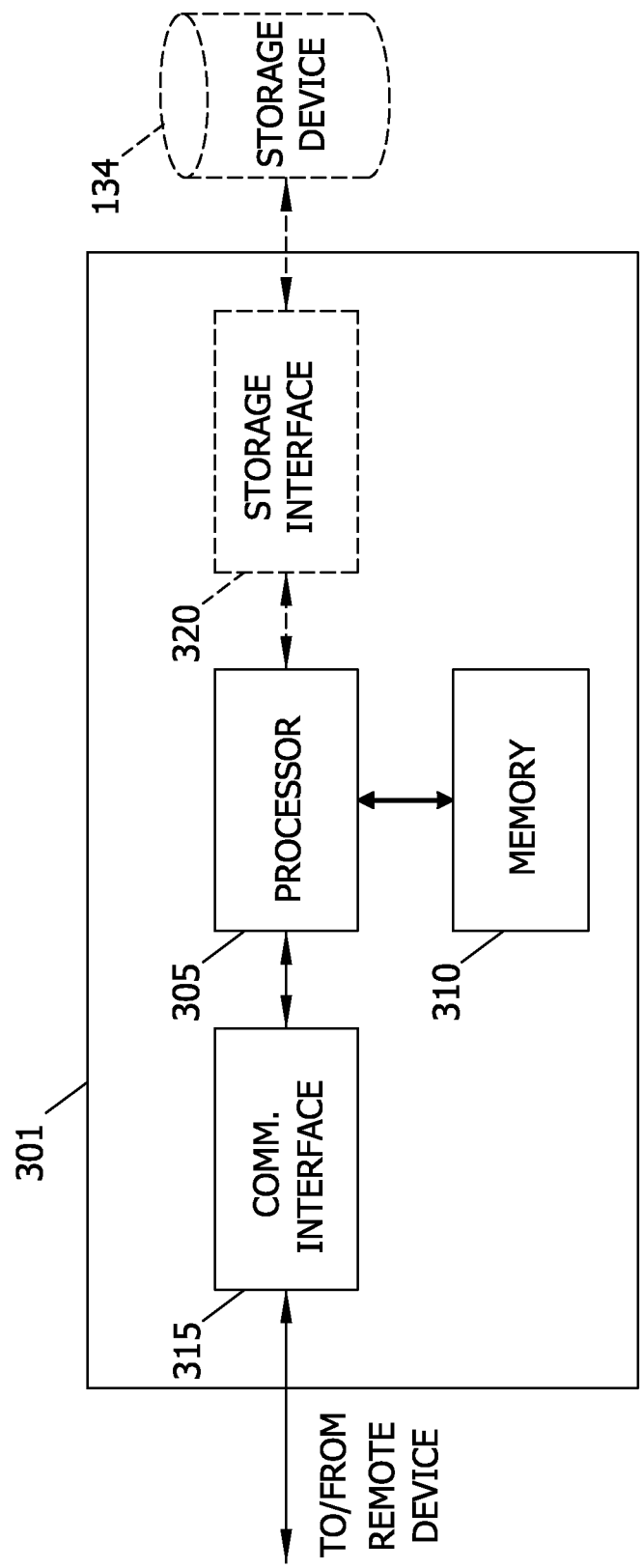

FIG. 5 illustrates an exemplary configuration of a server system 301 such as server system 112 (shown in FIGS. 2 and 3). Server system 301 may include, but is not limited to, database server 116, application server 124, web server 126, fax server 128, directory server 130, and mail server 132.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc).

Processor 305 is operatively coupled to a communication interface 315 such that server system 301 is capable of communicating with a remote device such as a user system or another server system 301. For example, communication interface 315 may receive requests from user system 114 via the Internet, as illustrated in FIGS. 2 and 3.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
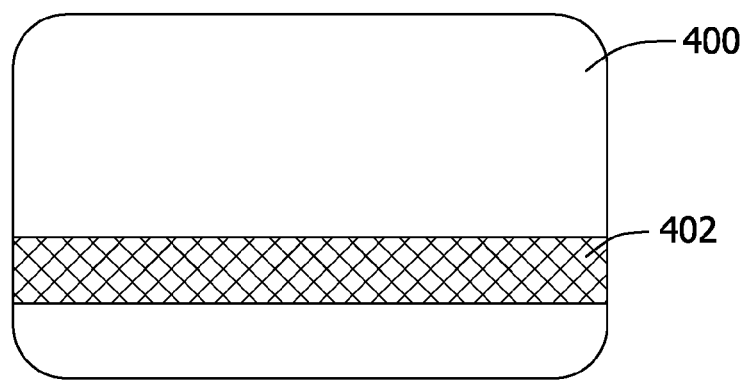

FIG. 6 illustrates a known financial transaction card 400 for use in payment processing system 122 (shown in FIG. 3). Financial transaction card 400 may include credit cards, debit cards, a charge card, a membership card, a promotional card, prepaid cards, and gift cards. Card 400 can be used as a method of payment for performing a transaction.

Financial transaction card 400 includes a magnetic stripe 402 for storing cardholder account data. The magnetic stripe 402 stores data by modifying the magnetism of tiny iron-based magnetic particles on a band of magnetic material on the card. The arrangement (N-S or S-N) provides an alternating magnetic field that produces a current when a user swipes transaction card 400 at a POS device. Magnetic stripe 402 is read by physical contact and swiping past a magnetic reading head housed within the merchant's POS device. Magnetic stripe 402 typically includes three tracks: track 1, track 2 and track 3. Track 2 is the most commonly used track and may contain cardholder account data including the account number, expiration date, and service code. Track 1 typically contains the same data as track 2, but further includes the cardholder's name and address. Track 3 is used by some organizations to implement ATM machines read and write functions, and uses unique organization encoding schemes.

Figure 7:
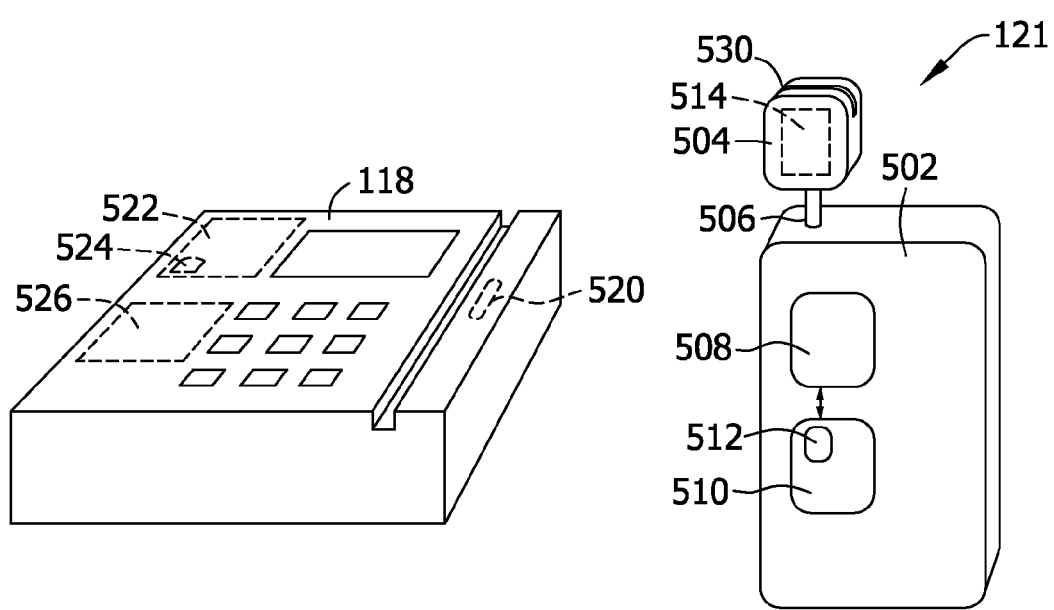

FIG. 7 illustrates an exemplary configuration of the cardholder computing system 121 and the merchant POS device 118 as shown in FIGS. 2 and 3 in accordance with an exemplary embodiment of the present invention. Cardholder computing system 121 includes a cardholder computing device 502 coupled to a transmitter 504 through an audio jack 506. In an alternative embodiment, cardholder computing device 502 may coupled to transmitter 504 through a proprietary interface such as a USB connector or an iPhone® dock connector. Cardholder computing device 502 includes a processor 508 and a memory device 510 for storing a first data file 512. Cardholder computing device 502 may include, for example, mobile phones, smartphones, personal digital assistants (PDAs), and/or any device capable of executing stored computer-readable instructions. Processor 508 executes instructions that are stored on memory device 510. Memory device 510 may include one or more computer readable media. In the example embodiment, transmitter 504 includes an electromagnet 514 for generating a magnetic field. Transmitter 504 controls electromagnet 514 to generate a changing magnetic field for connecting with POS device 118. In another embodiment, transmitter 504 includes an amplifier for transmitting an audio wave to POS device 118. In the case where the transmitter 504 has an amplifier, POS device 118 would include a microphone for receiving the audio wave.

POS device 118 includes a magnetic reader head 520, a POS processor 522 for processing a second data file 524, and a transceiver 526.

Processor 508 is configured to receive transaction card track data. The track data is stored in memory device 510 as first data file 512. In the exemplary embodiment, first data file 512 is a binary coded decimal (BCD) data file. Processor 508 executes instructions stored on memory device 510 to convert first data file 512 into a first audio waveform using amplitude and frequency shifts. Processor 508 then transmits the first waveform to transmitter 504, which with electromagnet 514 converts the first waveform into a second waveform and outputs the second waveform in the form of a magnetic field. The second waveform mimics the polarity changes of first data file 512. When transmitter 504 is placed within close proximity to magnetic reader head 520 of POS device 118, the magnetic field communicates with the data recovery circuit of magnetic reader head 520. The current created by electromagnet 514 generates a strobe pattern, which activates magnetic reader head 520 to receive incoming data. Magnetic reader head 520 receives the second waveform as though a transaction card was actually swiped in POS device 118. POS device processor 522 then receives and processes the second waveform. POS device processor 522 converts the second waveform into second data file 524, which represents the transaction card data. POS device processor 522 then generates an authorization request message that is transmitted by transceiver 526 to the issuer bank via an interchange network.

There are several ways for the transaction card track data to be entered into cardholder computing device 502. In one embodiment, a magnetic stripe reader 530 is integrated into the housing of transmitter 504. A user swipes transaction card 400 and processor 508 receives the transaction card track data. Processor 508 then stores first data file 512 in memory device 510 and converts it into a waveform for transmission. In an alternate embodiment, the creator or processor of transaction card 400, for example an issuing bank or an interchange network, sends to the user first data file 512 containing the user's data to be stored in memory device 510. First data file 512 may be sent to cardholder computing device 502 by means including, but not limited to email, text message, the Internet, or a removable storage device. In another alternate embodiment, the user manually inputs the transaction card data into cardholder computing device 502 using means including, but not limited to a touch screen, touch pad, keyboard, or mouse. Memory device 510 includes means to cause processor 508 to interpret the input data and convert it to a first wave file.

Figure 8:
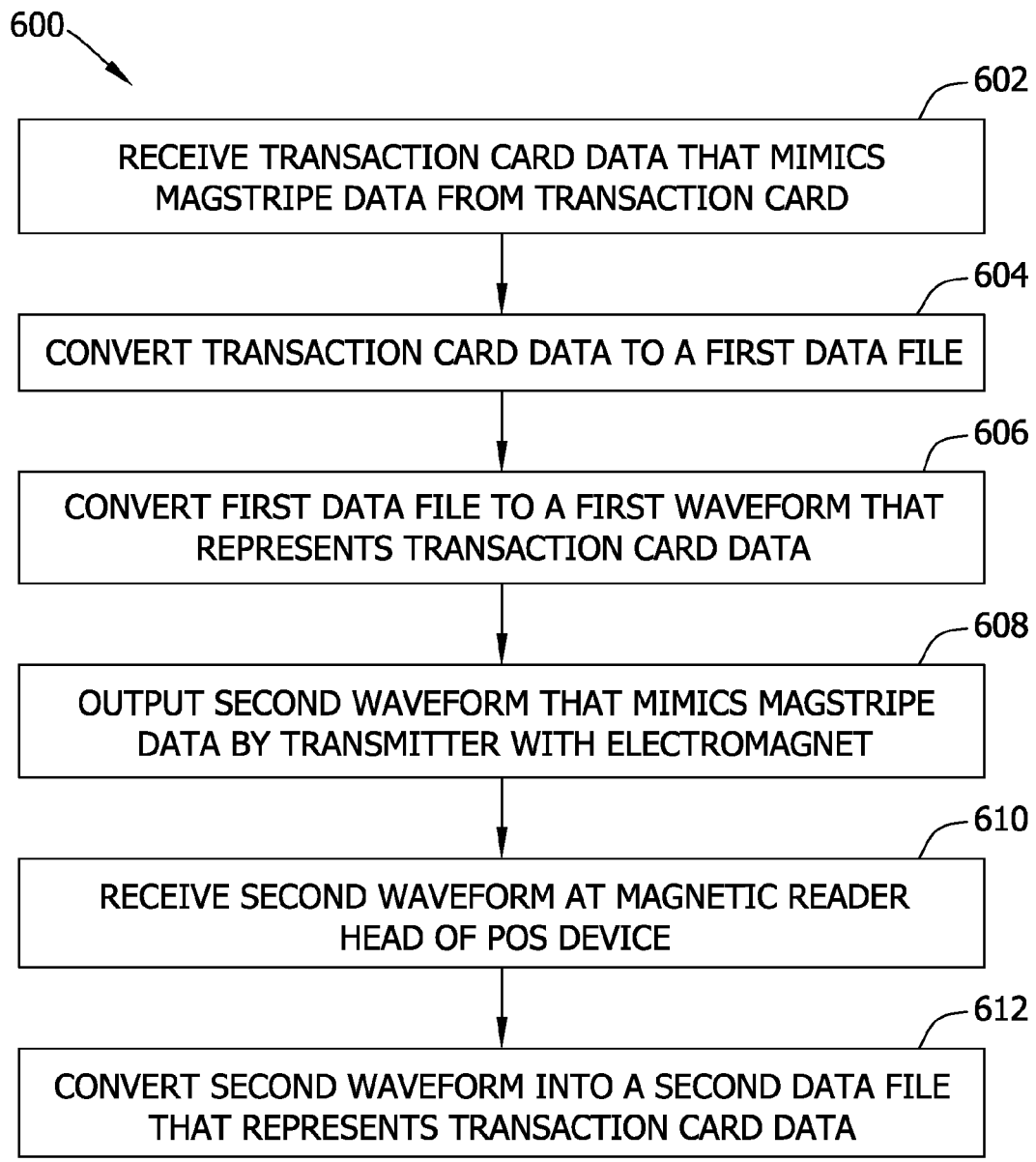

FIG. 8 is a flow diagram 600 showing the transmission of data between the cardholder computing system 121, the POS device 118, and the payment processing system 100, 122 as shown in FIGS. 2, 3, and 7 in accordance with an exemplary embodiment of the present invention. Cardholder computing device 502 (shown in FIG. 7) receives 602 transaction card data. The transaction card data mimics magstripe data stored on a transaction card issued to a cardholder by an issuing bank. Processor 508 (shown in FIG. 7) converts 604 transaction card data to first data file 512 (shown in FIG. 7) and stores it in memory device 510 (shown in FIG. 7). Processor 508 converts 606 first data file 512 into a first waveform and sends the first waveform through audio jack 506 (shown in FIG. 7) to transmitter 504 (shown in FIG. 7). Transmitter 504 converts the first waveform to a second waveform and outputs 608 the second waveform by electromagnet 514 (shown in FIG. 7) as a magnetic field. The magnetic field mimics the magstripe data stored on the transaction card. Magnetic reader head 520 (shown in FIG. 7) of POS device 118 (shown in FIGS. 2, 3, and 7) receives 610 the second waveform. POS device processor 522 (shown in FIG. 7) converts 612 the second waveform to second data file 524 (shown in FIG. 7), which represents the transaction card data. Transceiver 526 (shown in FIG. 7) transmits an authorization message to the issuer bank.

The above-described embodiments of methods and systems for contactless transmission of transaction card data by a consumer to a merchant's POS device without modification to the POS device. As a result, the methods and systems described herein facilitate contactless transmission of transaction card data to pre-existing POS devices.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is receiving transaction card data, converting the data into a first data file by a processor, converting the first data file to a first waveform by the processor, converting the first waveform into a second waveform for transmission by a transmitter, receiving the second waveform by a POS device, converting the second waveform into a second data file, and generating an authorization message to transmit to an issuer bank. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A portable computing device for transmitting transaction card data to a merchant point-of-sale (POS) device, said computing device comprising:
   a memory device for storing data;
   a processor; and
   a transmitter, said processor in communication with said memory device and said transmitter, said computing device programmed to:
      receive transaction card data that mimics data stored within a magnetic stripe associated with a transaction card;
      convert the transaction card data to a first data file for storage within said memory device;
      transmit the first data file to said transmitter; and
      transmit a first waveform from said transmitter to the POS device, wherein the first waveform comprises changing magnetic fields that represent the transaction card data, and wherein the changing magnetic fields are configured to be received remotely by a magnetic reader head of the POS device.

2. A portable computing device in accordance with claim 1, wherein said computing device is further programmed to convert the first data file into a second waveform, wherein the second waveform is an audio signal.

3. A portable computing device in accordance with claim 2, wherein the second waveform uses at least one of amplitude and frequency changes to represent polarity shifts included within the transaction card data.

4. A portable computing device in accordance with claim 1, wherein the first data file comprises binary coded decimal data.

5. A portable computing device in accordance with claim 4, wherein said computing device is further programmed to convert the binary coded decimal data into a second waveform comprising an audio signal, wherein the audio signal is outputted to said transmitter through at least one of an audio jack and a universal serial bus (USB) connector.

6. A portable computing device in accordance with claim 5, wherein said transmitter comprises an electromagnet, said transmitter configured to:
   receive the audio signal;
   convert the audio signal into the first waveform; and
   output the first waveform comprising the changing magnetic fields to the POS device, wherein the changing magnetic fields are receivable by the magnetic reader head of the POS device when the portable computing device is placed a distance away from the POS device.

7. A portable computing device in accordance with claim 1, wherein said transmitter comprises an electromagnet configured to output the changing magnetic fields that represent polarity changes included within the magstripe data of the transaction card.

8. A portable computing device in accordance with claim 7, wherein said transmitter is configured to output the changing magnetic fields to the magnetic reader head of the POS device when said transmitter is placed in close proximity to the POS device.

9. A portable computing device in accordance with claim 1, wherein said computing device is programmed to receive the transaction card data from at least one of a magnetic card reader coupled to said computing device, a remote computing device associated with an issuing bank that issued the transaction card, and an interchange network associated with processing transactions involving the transaction card.

10. A computer-implemented method of transmitting transaction card data from a portable computing device to a merchant POS device, wherein the portable computer device includes a memory device, a processor, and a transmitter, said method comprising:
    receiving transaction card data that mimics magnetic stripe data associated with a transaction card;
    converting the transaction card data to a first data file for storage within the memory device, the conversion being performed by the processor;
    communicating the first data file to the transmitter; and
    using the transmitter to transmit a first waveform to the POS device, wherein the first waveform comprises changing magnetic fields that represent the transaction card data, and wherein the changing magnetic fields are configured to be received remotely by a magnetic reader head of the POS device.

11. A computer-implemented method in accordance with claim 10, further comprising converting, by the processor, the first data file into a second waveform, wherein the second waveform is an audio signal.

12. A computer-implemented method in accordance with claim 11, wherein the second waveform uses at least one of amplitude and frequency changes to represent polarity shifts included within the transaction card data.

13. A computer-implemented method in accordance with claim 10, wherein the first data file comprises binary coded decimal data.

14. A computer-implemented method in accordance with claim 10, wherein converting the transaction card data further comprises:
converting the transaction card data into a first data file; and
converting the first data file into a second waveform being an audio signal, wherein the audio signal is outputted to the transmitter through at least one of an audio jack and a USB connector.

15. A computer-implemented method in accordance with claim 14, wherein converting the first data file into a second waveform further comprises:
receiving the audio signal at the transmitter, the transmitter including an electromagnet;
converting the audio signal into the first waveform; and
outputting the first waveform comprising the changing magnetic fields to the POS device, wherein the changing magnetic fields are receivable by the magnetic reader head of the POS device when the portable computing device is placed a distance away from the POS device.

16. A computer-implemented method in accordance with claim 10, wherein using a transmitter to transmit a first waveform to the POS device further comprises outputting, by the transmitter, the changing magnetic fields that represent polarity changes included within the magstripe data of the transaction card, the transmitter including an electromagnet.

17. A computer-implemented method in accordance with claim 16, wherein outputting the changing magnetic fields further comprises outputting the changing magnetic fields by the transmitter positioned in close proximity to the magnetic reader head included in the POS device.

18. A computer-implemented method in accordance with claim 10, wherein receiving transaction card data further comprises receiving transaction card data from at least one of a magnetic card reader coupled to the computing device, a remote computing device associated with an issuing bank that issued the transaction card, and an interchange network associated with processing transactions involving the transaction card.

19. One or more non-transitory computer-readable storage media having computer-executable instructions embodied thereon for causing the transmission of transaction card data from a portable computing device to a merchant POS device, wherein the portable computing device includes a memory device, a processor, and a transmitter, wherein when executed by the processor, the computer executable instructions cause the processor to:
receive transaction card data that mimics data stored within a magnetic stripe associated with a transaction card;
convert the transaction card data to a first data file for storage within the memory device;
transmit the first data file to the transmitter; and
transmit a first waveform from the transmitter to the POS device, wherein the first waveform comprises changing magnetic fields that represent the transaction card data, and wherein the changing magnetic fields are configured to be received remotely by a magnetic reader head of the POS device.

20. The one or more non-transitory computer-readable storage media in accordance with claim 19, wherein the computer-executable instructions further cause the processor to convert the first data file into a second waveform, wherein the second waveform is an audio signal that uses at least one of amplitude and frequency changes to represent polarity shifts included within the transaction card data.

21. The one or more non-transitory computer-readable storage media in accordance with claim 19, wherein the computer-executable instructions further cause the processor to:
convert the first data file into a second waveform comprising an audio signal, wherein the first data file includes binary coded decimal data; and
output the audio signal to the transmitter through at least one of an audio jack and a USB connector.

22. The one or more non-transitory computer-readable storage media in accordance with claim 19, wherein the computer-executable instructions further cause the processor to transmit the first waveform to the POS device by the transmitter, the transmitter including an electromagnet, the transmitter configured to emit the changing magnetic fields, the changing magnetic fields receivable by the magnetic reader head of the POS device when the transmitter is positioned in close proximity to the POS device.

* * * * *